Patented Sept. 17, 1940

2,215,379

UNITED STATES PATENT OFFICE 2,215,379

PREPARATION OF COPOLYMERS OF BUTADIENE AND VINYLIDENE CHLORIDE

Lorin B. Sebrell, Silver Lake, Ohio, assignor to Wingfoot Corporation, Wilmington, Del., a corporation of Delaware No Drawing. Application November 25, 1938, Serial No. 242,287

9 Claims. (Cl. 260—79)

This invention relates to polymerization products prepared by the inter-polymerization or copolymerization of two different monomeric substituents, particularly, to copolymers of a butadiene and vinylidene chloride.

It has been found that butadiene and its homologues may be mixed with vinylidene chloride, $CH_2=CCl_2$, to yield plastic masses of rubbery to resinous constitution. These products have various rubber-like properties and may be vulcanized with sulfur and other rubber-compounding ingredients to yield a useful material.

Preferably, 1-3-butadiene is copolymerized with vinylidene chloride, but other homologues of butadiene, such as 2-methyl 1-3-butadiene and 2-3-dimethyl 1-3-butadiene may also be mixed with the vinylidene chloride and polymerized.

The butadiene should be present in the monomeric mixture to the extent of at least 50%, and this proportion may be as high as 65% or more, the remainder of the mixture being vinylidene chloride which is present, accordingly, in amount from about 35% to 50%. These proportions yield plastic masses which most nearly resemble rubber in their properties.

The method of polymerization employed is preferably that in which the monomers are heated in an aqueous emulsion containing sodium oleate or similar emulsifying agent. Catalysts may be employed, such as the peroxides, e. g., benzoyl peroxide, sodium perborate, etc. Promoters may also be used, such as carbon tetra chloride or trichloro propio nitrile. In addition, other substances which modify the course of the polymerization or the type of product obtained may be present.

The monomeric mixture is added to the emulsion and heated in a closed vessel for an extended period of time until polymerization is substantially completed. The time necessary may be anywhere from a few hours to several days, depending on the mixture being treated, the conditions under which the reaction is being conducted and the type of product desired; it is preferred to polymerize at a temperature of 50° C., but the temperature may be either higher or lower, a temperature as high as 80° C. sometimes being employed to finish the reaction.

The following examples illustrate one method of polymerizing in an emulsion, but it will be understood that the conditions set forth may be modified and other methods of polymerization may be employed, for example mass polymerization, or absence of diluents.

Example 1

Several glass bombs were each charged with 20 grams of 3% sodium oleate solution containing 0.133 gram of $NaBO_3.4H_2O$ and 0.48 gram of $CCl_4$, together with a mixture of butadiene and vinylidene chloride in the proportions set forth below. Polymerization was conducted at a temperature of 50° C. for a period of about 112 hours. The products were then washed with alcohol, dried and milled. The yields obtained and the nature of the product are set forth below.

| $C_4H_6$, grams | $CH_2.CCl_2$, grams | Ratio | Percent yield | Product |
|---|---|---|---|---|
| 0.0 | 16.0 | 0/100 | None | |
| 3.2 | 12.8 | 20/80 | None | |
| 5.6 | 10.4 | 35/65 | None | |
| 8.0 | 8.0 | 50/50 | 86.2 | Tough, soft, pliable. |
| 10.4 | 9.6 | 65/35 | 84.3 | Do. |
| 12.8 | 3.2 | 80/20 | 80.3 | Tends to granulate. |

It will be noted that no polymerization was indicated when the ratio of butadiene in the monomeric mixture was less than 50%, but that at 50% a substantial conversion of the starting materials was obtained. However, when the ratio of butadiene was increased to 80% of the whole, the yield, while still satisfactory in quantity, was unsatisfactory in its characteristics, the copolymer having developed a tendency to granulate and having lost the tough but soft and pliable nature of the products obtained when the proportion of butadiene was held between 50 and 65%. Accordingly, it has been developed that mixtures of butadiene and vinylidene chloride within this range of proportions yield useful polymers upon heating but that mixtures outside of this range do not give a useful result.

In order to test the curing properties of these polymers, the plastic mass prepared from 100 grams of butadiene and 100 grams of vinylidene chloride, a 50-50 mixture, was compounded in the following formula:

| | Parts |
|---|---|
| Polymer | 105.00 |
| Stearic acid | 3.00 |
| ZnO | 5.00 |
| Carbon black | 48.25 |
| Sulfur | 2.50 |
| Accelerator | 1.50 |

This formula is similar to that employed in compounding rubber for testing purposes. The compounded stock containing the polymer was then cured and its physical strength tested with the following results:

| Cured | Tensile | Elongation | Modulus @ 200 |
|---|---|---|---|
| 100/260° F | 212 | 210 | 192 |

It will be noted that the tensile strength was fairly high and this property, as well as the elongation and modulus, compare very well with the same properties in a rubber stock.

It will be understood that the examples hereinabove set forth illustrate only a preferred embodiment of the invention and that the same is susceptible of modification within the limits defined. Thus, the method and means of copolymerization may be altered as necessary provided the monomers are present in the specified proportions, namely, from 50 to 65% of butadiene and the remainder vinylidene chloride. The temperature employed for the polymerization will usually be in the neighborhood of 50° C. but may be varied somewhat, a lower temperature being employed for a longer time to complete the polymerization and a higher temperature, but ordinarily not exceeding 80° C., being employed for a shorter time.

It is intended, then, that the patent shall cover, by suitable expression in the accompanying claims, all features of patentable novelty residing in the invention.

What I claim is:

1. Plastic masses obtained by the polymerization of a mixture containing as the sole polymerizable constituents thereof a member of the group consisting of butadiene and its hydrocarbon homologues and vinylidene chloride in which the butadiene is present in amount from 50 to 65% of the total monomer treated.

2. The copolymerization product of a mixture containing as the sole polymerizable constituents thereof butadiene and vinylidene chloride in which the butadiene is present in amount from 50 to 65% of the total monomer treated.

3. Plastic masses obtained by the polymerization of a monomeric mixture containing as the sole polymerizable constituents thereof about 65% of butadiene and about 35% of vinylidene chloride.

4. Plastic masses obtained by the polymerization of a monomeric mixture containing as the sole polymerizable constituents thereof about equal parts of butadiene and vinylidene chloride.

5. A method of preparting plastic masses which comprises heating at a temperature of about 50° C. a mixture containing as the sole polymerizable constituents thereof about equal parts of butadiene and vinylidene chloride in an aqueous emulsion of sodium oleate containing sodium perborate until polymerization is completed.

6. A method of preparing plastic masses which comprises heating at a temperature of about 50° C. a mixture containing as the sole polymerizable constituents thereof approximately equal parts of butadiene and vinylidene chloride in an aqueous emulsion of sodium oleate containing sodium perborate until polymerization is completed.

7. A method of preparing plastic masses which comprises heating at a temperature of about 50° C. a mixture containing as the sole polymerizable constituents thereof butadiene and vinylidene chloride containing from about 50% to 65% of butadiene in an aqueous emulsion of sodium oleate containing sodium perborate and carbon tetrachloride until polymerization is completed.

8. A rubber-like material consisting of the sulfur vulcanizate of a copolymer of about 65% of butadiene and about 35% of vinylidene chloride.

9. A rubber-like material consisting of the sulfur vulcanizate of a copolymer of butadiene and vinylidene chloride prepared from a monomeric mixture containing from 50 to 65% of butadiene and the remainder vinylidene chloride.

LORIN B. SEBRELL.